United States Patent Office 3,525,736
Patented Aug. 25, 1970

3,525,736
SUBSTITUTED DIAZIRIDINES AND DIAZIRINES
Robert Fitz Randolph Church, Riverside, Conn., and Martin Joseph Weiss, Oradell, N.J., assignors to American Cyanamid Company, Stamford, Conn., a corporation of Maine
No Drawing. Filed Dec. 30, 1966, Ser. No. 606,017
Int. Cl. C07d 45/00, 49/32, 87/38
U.S. Cl. 260—239
8 Claims

ABSTRACT OF THE DISCLOSURE

Diazirine containing and diaziridine containing aliphatic alcohols, carboxylic acids, esters, acetals, amines and amine derivatives are prepared from the corresponding ketone or by subsequent transformations of diazirine containing compounds. These compounds are useful as blood sugar lowering agents, diuretics, analgesics, blood cholesterol lowering agents, anti-inflammatory agents and herbicides.

This invention relates to new diazirine compounds. More particularly, the invention relates to novel azo substituted aliphatic compounds having one or more functional groups attached thereto and their methods of preparation.

The novel compounds of this invention may be illustrated by the following general formula:

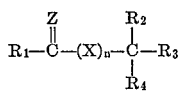

wherein Z is a divalent radical selected from the group consisting of

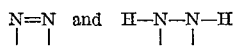

X is a lower alkylene group; $n$ is selected from the group consisting of zero and one; $R_1$ is selected from the group consisting of lower alkyl, carboxy lower alkyl, halocarbonyl lower alkyl, and halo lower alkyl; $R_2$ is selected from the group consisting of hydrogen and lower alkyl; $R_3$ is selected from the group consisting of hydrogen, lower alkyl and mononuclear aryl; $R_4$ is selected from the group consisting of halogen, carboxy, halocarbonyl, silver carboxylate, formyl, alkoxycarbonyl, mononuclear aryl lower alkoxycarbonyl, lower alkoxy lower alkoxy carbonyl, lower alkenyloxycarbonyl, lower alkynyloxycarbonyl, azi lower alkoxycarbonyl, pyridyl lower alkoxycarbonyl, bis-lower alkylamino lower alkoxycarbonyl, polymethyleneimino lower alkoxycarbonyl, N-lower alkyl-N-mononucleararylamino lower alkoxy carbonyl, mononucleararyloxy lower alkoxycarbonyl, halo lower alkoxycarbonyl, lower alkylsufonyloxy, mononucleararylsulfonyloxy, lower alkyl mononucleararylsulfonyloxy, halo mononucleararylsulfonyloxy, alkanoyloxy, azi lower alkanoyloxy, mononuclear aroyloxy, pyridyl carbonyloxy, lower alkoxy mononuclear aroyloxy, halo mononuclear aroyloxy, alkanoylamino, azi alkanoylamino, mononuclear aroylamino, lower alkyl mononuclear aroylamino, mononuclear aryl lower alkanoylamino, lower alkenoylamino, N-(lower alkyl) carbamoyloxy, N,N'-(bis-mononuclear aryl) hydrazinocarbonyl, 1,2-(bis-mononuclear aryl)-3,5-dioxo-pyrazolidinyl, amino, dialkyl amino, dicycloalkyl amino, bis-lower alkenyl amino, bis-lower alkynyl amino, N-(bis-lower alkyl amino lower alkyl)-N-(lower alkyl)amino, N-(mononuclear aryl lower alkyl)-N-(lower alkyl)-amino, bis-N, N-(mononuclear aryl lower alkyl)amino, polymethyleneimino, oxapolymethyleneimino, monounsaturated polymethyleneimino, N-lower alkylazapolymethyleneimino, benzopolymethyleneimino, phenothiazinyl, N-(lower alkyl)ureido, N-(lower alkyl mononuclear arylsulfonyloxy)ureido, biguanyl, N-alkyl thioureido, N-mononuclear aryl thioureido, N-(lower alkyl mononucleararyl)thioureido, N-(lower alkenyl)thioureido; and $R_3$ and $R_4$ taken together are selected from the group consisting of semicarbazono, thiosemicarbazono, hydrazono, N-(halo substituted mononucleararyl)hydrazono, N-(polynitro substituted mononuclear aryl)hydrazono, hydroxyimino, N-(polymethyleneimino)imino; with the provisio that when Z is

then $R_1$ is selected from the group consisting of lower alkyl and carboxy lower alkyl and $R_4$ is selected from the group consisting of carboxy and halogen; and the pharmaceutically acceptable salts thereof.

The preparation of the novel compounds of this invention as to the reactive groupings may be represented as follows:

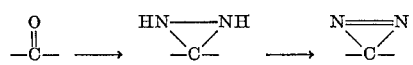

The intermediate diaziridines are prepared in a convention as to the reactive groupings may be represented ammonia, preferably in the presence of a solvent such as a lower alkyl alcohol, and subsequently with hydroxylamine-O-sulfonic acid or chloramine. The reaction is carried out at a temperature below 40° C. and preferably at a temperature of about 0° C. to —45° C. The crude diaziridines are characterized by their strong positive test on acidic starch-iodide reagent, infrared absorption at 2.9μ, and the loss of ketonic absorption in the infrared spectrum at 5.8–5.9μ. After complete removal of the ammonia, treatment of the crude diaziridines with a base, preferably an organic base such as a triloweralkylamine, followed by iodine, either alone or in a solvent, affords the respective diazirines. The diaziridines, therefore, are useful as intermediates for the preparation of the diazirines.

This oxidation of diaziridines with iodine in the presence of a base constitutes a novel and unobvious method of oxidizing diaziridines to diazirines. The method is unusual in that diazidine compounds are reduced by iodide ion is in the acidic media but oxidized in the basic media. This method offers several advantages over older methods, as for example, increased yield and purity of the diazirines, and the greatly facilitated handling of relatively harmless oxidizing agents. Further, in this method the oxidation with iodine may be carried out on the diaziridines in the crude state without isolation.

The product diazirines are isolated by distillation or crystallization. They may be characterized by the appearance of infrared absorption at 6.3–6.4μ with concommitant loss of infrared absorption at about 2.9μ, by the appearance of ultraviolet absorption usually at 346–348 mμ and 360–365 mμ, and by elemental analysis. The majority of the novel compounds of this invention may be prepared from starting compounds available commercially or whose preparation is well known in the art.

The novel compounds of this invention are useful as blood sugar lowering agents, diuretics, analgesics, blood cholesterol lowering agents, anti-inflammatory agents and herbicides and in addition, are useful as intermediates for the preparation of other novel and useful compounds.

The following examples illustrate the praparation of representative diazirine compounds of the invention in greater detail and in some instances, the actvity of the compounds.

EXAMPLE I

Preparation of 4,4-hydrazipentanol-1 and 4,4-azopentanol-1

A solution of 15.4 g. of 4-ketopentanol-1 in 50 ml. of methanol is added carefully to 150 ml. of liquid ammonia and the solution is stirred at reflux temperature for 5½ hours. The solution is cooled in Dry Ice-acetone and 20 g. of hydroxyamine-O-sulfonic acid in 80 ml. methanol is added over a period of about ½ hour. The colorless mixture is warmed to reflux and stirred for 2 hours, then allowed to warm to room temperature overnight allowing for the evaporation of excess ammonia. The mixture is filtered, the precipitate is washed with several small portions of methanol, and the filtrate and washings are combined. The resulting solution is evaporated at reduced pressure until no further ammonia remains in the solution (about ⅓ original volume). This solution of the intermediate 4,4-hydrazipentanol-1 gives a strong positive test on acidic starch iodide paper.

To the above solution of 4,4-hydrazipentanol-1 is added 35 ml. triethylamine, the solution is cooled in ice, stirred rapidly, and a solution of iodine in methanol is added until the red color of iodine persists for several seconds. The resulting solution is evaporated and the residue is distilled to yield the product, boiling point 42° C. at 2.5 mm.

The compound of this example exhibits diuretic, hypoglycemic and hypocholesteremic activity.

EXAMPLES II THROUGH XII

The following products are prepared by the method described in Example I using appropriate starting compounds as shown.

| Example | Starting material | Intermediate diaziridine | Product diazirine | Boiling point |
|---|---|---|---|---|
| II | 2-ketopropanol | 2,2-hydrozipropanol | 2,2-azopropanol | 29–32° C./4mm. |
| III | 2-keto-1,1-diethoxypropane | 1,1-diethoxy-2,2-hydrozipropane | 2,2-azo-1,1-diethoxypropane | |
| IV | 2-ketopropane-1,3-diol | 2,2-hydrozipropane-1,3-diol | 2,2-azopropane-1,3-diol | |
| V | 3-ketobutanol-1 | 3,3-hydrozaibutanol-1 | 3,3-azobutanol-1 | 43° C./5 mm. |
| VI | 3-ketobutanol-2 | 3,3-hydrzaibutanol-2 | 3,3-azobutanol-2 | |
| VII | 3-keto-1,1-dimethoxybutane | 1-1-dimethpropyl-4,4-azo-propane | 3,3-azo-1,1-dimethoxy-butane | 44.5° C. 12 mm. |
| VIII | 3-keto-2-methylbutanol-1 | 3,3-hydrazi-2-methylbutanol-1 | 3,3-azo-2-methylbutanol-1 | |
| IX | 1-chloropentanone-4 | 1-chloro-4,4-hydrazipentane | 4,4-azo-1-chloropentane | |
| X | 1,1-diethoxypentan-4-one | 1,1-diethoxy-4,4-hydrazipentane | 4,4-azo-1,1-diethoxypentane | 42–43° C./2.5 mm. |
| XI | 4-ketopentanoic acid | 4,4-hydrazipentanoic acid | 4,4-azopentanoic acid | 66–72° C./0.12 mm. |
| XII | 4-keto-2-methylpentanol-2 | 4,4-hydrazi-2-methylpentanol-2 | 4,4-azo-2-methylpentanol-2 | |

The diazirine products of Examples III, VII, and X exhibit diuretic activity. The diazirine products of Examples V, VII and XI exhibit hypoglycemic activity. The diazirine product of Example V exhibits herbicidal activity.

EXAMPLE XIII

Preparation of 4,4-hydrazi-2-phenylpentanoic acid and 4,4-azo-2-phenylpentanoic acid A stirred solution of 20 g. of α-phenyl levulinic acid in 500 ml. liquid ammonia is stirred at reflux temperature for six hours, cooled to −45° C. and a solution of 20 g. of hydroxyamine-O-sulfonic acid in 100 ml. methanol is added over a period of 1 hour. The mixture is stirred at reflux for 1 hour and allowed to warm to room temperature overnight allowing excess ammonia to escape. The mixture is filtered, the precipitate is washed with methanol and the filtrate and washings are combined. To this solution is added 20 ml. of 5 N sodium hydroxide and the solution is evaporated at reduced pressure to a volume of about 100 ml. The solution is cooled to −15° C. and acidified to pH <3 using hydrochloric acid. The acidic solution is extracted with several small portions each of methylene chloride and ether. The aqueous solution containing the intermediate 4,4-hydrazi-2-phenylpentanoic acid is made alkaline with sodium hydroxide and then added dropwise with ice cooling to a well stirred mixture of silver oxide in water (made up by adding with vigorous shaking a solution of 200 ml. of 2 N silver nitrate to a solution of 200 ml. of 2 N sodium hydroxide). The mixture is filtered through diatomaceous earth, made strongly acidic with hydrochloric acid, and extracted with several portions of methylene chloride. The organic extracts are combined and dried over sodium sulfate. After removal of the solvent at reduced pressure, the crystalline residue is recrystallized from methanol-water to give 9.54 g. of 4,4-azo-2-phenylpentanoic acid, melting point 73.5–75° C.

The diazirine of this example exhibits herbicidal activity.

EXAMPLE XIV

Preparation of 5,5-hydrazihexanoic acid and 5,5-azohexanoyl chloride

A solution of 150 g. of 4-acetyl butyric acid in 1750 ml. of liquid ammonia is stirred 4 hours at reflux, then cooled to −50° C. and a slurry of 150 gm. of hydroxylamine-O-sulfonic acid in 1.05 liters of methanol is added portion wise, holding the temperature of the reaction medium below −40° C. The resultant slurry is allowed to warm to reflux, then to room temperature overnight while the ammonia evaporates. The mixture is filtered and the solid portion is washed several times using 700 ml. of methanol. The filtrates are combined and evaporated to 750 ml. at reduced pressure. About 300 ml. of methanol and 180 ml. of triethylamine are added and the mixture is concentrated to about 750 ml. The solution containing 5,5-hydrazihexanoic acid is cooled to 0° C. and concentrated hydrochloric acid is added to pH 3, keeping the temperature at or below 0° C. The acidified solution is extracted rapidly with three 300 ml. portions of ether. The aqueous phase is treated with 160 ml. of triethylamine (to pH 8) and then portionwise with 96 gm. of iodine, maintaining the pH near 8 by further addition of triethylamine. When the reaction is complete as indicated by very slow decolorization of iodine, the solution is concentrated to 750 ml., 1500 ml. of water is added and the aqueous solution is extracted with three 400 ml. portions of ether. The aqueous phase is strongly acidified with concentrated hydrochloric acid and extracted with seven 300 ml. portions of ether. The combined ethereal extracts are dried over magnesium sulfate and concentrated to an oil.

The oily residue is treated with 100 g. of oxalyl chloride and allowed to stand protected from moisture for 16 hours. The excess oxalyl chloride is evaporated at reduced pressure and the residue is distilled giving the product with boiling point 51° C. at 1.5 mm.

EXAMPLE XV

Preparation of 6,6-hydraziheptanoic acid and 6,6-azoheptanoyl chloride

Using the method of Example XIV and substituting 5-acetylvaleric acid for 4-acetylbutyric acid, the 6,6-azoheptanoyl-chloride (via 6,6-hydraziheptanoic acid) with boiling point 50–54° C. at 0.6 mm. is obtained.

EXAMPLE XVI

Preparation of 5,5-azohexaonic acid

To a solution of 4 gm. of sodium hydroxide in 16 ml. of water is added, with good stirring, 7.5 gm. of 5,5-azohexanoyl chloride. When the exotherm is over and the solution cooled, it is acidified with hydrochloric acid and extracted with several portions of ether. The combined ethereal extracts are dried over magnesium sulfate and the solvent is evaporated at reduced pressure. The residue crystallizes at −80° C. Recrystallization from light petroleum ether affords the product with the melting point 10–12° C.

The compound of this example exhibits anti-inflammatory, hypoglycemic, hypocholesteremic, and herbicidal activity.

EXAMPLE XVII

Preparation of 6,6-azoheptanoic acid

The above product, melting point 8–10° C., is obtained by the method of Example XVI, substituting 6,6-azoheptanoyl chloride for 5,5-azohexanoyl chloride.

EXAMPE XVIII

Preparation of 4,4-hydrazipimelic acid and 4,4-azopimelic acid

A solution of 25 g. of 4-ketopimelic acid in 250 ml. of liquid ammonia and 50 ml. of methanol is stirred 5 hours at reflux, cooled to −40° C. and 5 portions of 4 g. each of hydroxylamine-O-sulfonic acid in 25 ml. methanol are added at 15 minute intervals. The mixture is stirred at reflux for about 1 hour, then allowed to warm to room temperature overnight allowing excess ammonia to evaporate. The mixture is filtered and the precipitate is dried. One-fifth of the crude 4,4-hydrazipimelic acid is suspended in 100 ml. of methanol and treated with 6 g. of sodium hydroxide. The mixture is shaken 15 minutes and the solvent is evaporated at 40° C. under reduced pressure to about 35 ml. The residue containing the intermediate 4,4-hydrazipimelic acid is added to a stirred mixture of silver oxide in methanol. (The silver oxide is prepared by mixing together 100 ml. of 1 N sodium hydroxide with a solution of 17 g. of silver nitrate in 100 ml. of water, allowing the silver oxide so formed to settle, decanting the supernatant solution and washing the residual silver oxide by decantation with four portions of methanol of about 200 ml. each. The silver oxide is then suspended in 200 ml. of methanol.) The mixture is stirred for 72 hours, filtered through diatomaceous earth, the filtrate retreated with a similar quantity of silver oxide at 50° C. for 6 hours, refiltered through diatomaceous earth, and the filtrate is evaporated under reduced pressure to about 75 ml. The residual solution is made acid to Congo red paper with hydrochloric acid and the product crystallizes, melting point 121–123° C. The product diazirine is recrystallized from hexane with no change in the melting point.

EXAMPLE XIX

Preparation of 4,4-azocyclohexanone oxime

A solution of 890 mg. of cyclohexanedione is added to 100 ml. of methanol saturated at 0° C. with ammonia, and the solution is stirred 1½ hours at 0° C.±2°. A solution of 1.80 g. of hydroxylamine-O-sulfonic acid in 10 ml. of methanol is added dropwise and the resulting solution is stirred 2½ hours at 0° C., then filtered. The filtrate is evaporated to a volume of about 50 ml. and added to a solution of 4.4 g. of silver nitrate in 20 ml. of water. To this solution is added dropwise a solution of 1.0 g. of sodium hydroxide in 20 ml. of 50% (by volume) methanol in water. The mixture is stirred 2½ hours and filtered free of precipitated silver and silver oxide. The filtrate is extracted with several portions of methylene chloride, the extracts are combined and dried, and the solvent is evaporated at reduced pressure. The oily residue is chromatographed on 7 g. of silica gel. Elution with 5% ether-in-benzene affords the product, which crystallizes in fine needles from ether-hexane, melting point 88–90° C.

EXAMPLE XX

Preparation of 4,4-azopentanoic acid silver salt

A solution of 835 mg. of 4,4-azopentanoic acid in 10 ml. of water is treated with 2.6 ml. of 2.5 N sodium hydroxide. The solution is diluted to 75 ml. with water and 6.5 ml. of 1 N silver nitrate is added dropwise with shaking. The tan precipitated solid is filtered off, washed with water, methanol and dried to give the silver salt.

EXAMPLE XXI

Preparation of methyl 4,4-azopentanoate

A solution of 8.0 g. of 4,4-azopentanoic acid in 50 ml. of methanol is treated with a trace of hydrogen chloride and allowed to stand for 16 hours. The solution is poured into 100 ml. of water and extracted with several portions of ether. The extracts are combined, washed with saturated aqueous sodium bicarbonate and dried over sodium sulfate. After evaporation of the solvent at reduced pressure, the residue is distilled, the product boiling at 45° C. at 5.5 mm.

The compound of this example exhibits diuretic and hypoglycemic activity.

EXAMPLE XXII

Preparation of 4,4-azopentanoyl chloride

A solution of 12.4 g. of 4,4-azopentanoic acid and 15.4 g. of oxalyl chloride is allowed to stand 16 hours protected from atmospheric moisture. The solution is distilled, the fraction boiling at 38° C. at 5 mm. being collected as the product.

EXAMPLE XXIII

Preparation of 4,4-azopimelyl chloride

A solution of 248 mg. of 4,4-azopimelic acid in 2.5 ml. of oxalyl chloride is allowed to stand 16 hours at room temperature protected from atmospheric moisture. Excess oxalyl chloride is removed at reduced pressure at room temperature, 30 ml. of dry benzene is added and the benzene is distilled off in a warm water bath at reduced pressure until the residual volume is about 3 ml. The residue is diluted with about 15 ml. of benzene and used without further purification.

EXAMPLE XXIV

Preparation of 5,5-azohexanoyl chloride

A solution of 2.8 g. of purified 5,5-azohexanoic acid and 6 ml. of oxalyl chloride is allowed to stand 16 hours at room temperature. Excess oxalyl chloride is distilled off at reduced pressure, the residue is treated with 30 ml. of dry benzene and the benzene is evaporated at reduced pressure to a residual volume of about 5 ml. The residue is treated with 30 ml. of dry benzene and used without further purification.

EXAMPLE XXV

Preparation of 4,4-azo-2-phenylpentanoyl chloride 4,4-azo-2-phenylpentanoyl chloride is prepared from 2-phenyllevulinic acid by the method of Example XXIV. It is used as a crude solution in benzene.

EXAMPLE XXVI

Preparation of 3,3-azo-1,5-dichloropentane and 4,4-azo-6-chlorohexanoic acid

A mixture of 8.86 g. of lead tetraacetate and 0.93 g. of 4,4-azopimelic acid in 50 ml. of benzene is stirred and flushed with nitrogen and 0.90 g. of lithium chloride is added. The mixture is warmed to 75–80° C. and held 1½ hours, then cooled and poured into 25 ml. of concentrated hydrochloric acid. The aqueous layer is separated and extracted several times with ether, the ethereal extracts are extracted with saturated sodium bicarbonate, 0.1 N sodium thiosulfate, and saturated sodium chloride, and then dried over sodium sulfate. The ether is removed at reduced pressure, leaving 3,3-azo-1,5-dichloropentane as a colorless oil.

The sodium bicarbonate extracts are combined and made acidic with concentrated hydrochloric acid. The acid solution is extracted with several small portions of ether, and the combined extracts are dried over sodium sulfate. The ether is removed at reduced pressure leaving 4,4-azo-6-chlorohexanoic acid as a gum.

EXAMPLE XXVII

Preparation of 3,3-azobutyric acid

To 12.0 ml. of a solution of 26.72 g. of chromic acid in 23 ml. of concentrated sulfuric acid diluted to 100 ml. with water is added 5 drops concentrated sulfuric acid. The solution is cooled to 2° C. and 2.00 g. of 3,3-azobutanol-1 (Example V) is added dropwise with stirring. The solution is stirred at 4° C.±4° for 1 hour, then treated dropwise with 20 ml. of 5 N sodium hydroxide solution. The resulting precipitate is filtered off, the filtrate is saturated with salt and extracted with several portions of ether. The aqueous phase is made strongly acidic with hydrochloric acid and the resulting solution is continuously extracted with ether for 5 hours. The ethereal extract is dried over sodium sulfate, and the ether is removed at reduced pressure, leaving an oily residue. Distillation of the residue at 49–51° C. at 0.16 mm. gives the product.

EXAMPLE XXVIII

Preparation of 3,3-azo-1-(p-toluenesulfonyloxy)butane

A solution of 10.1 g. of 3,3-azobutanol-1 (Example V) in 80 ml. of pyridine is cooled while adding 20 g. of p-toluene-sulfonyl chloride in portions. The solution is stirred at 5° C.±5° for 2 hours and allowed to stand at 4° C. for 16 hours. The mixture is poured into 150 ml. of hydrochloric acid in 600 g. of ice, and the oily layer is extracted into ether. The ethereal extract is washed with cold dilute hydrochloric acid, cold dilute sodium hydroxide and brine, and then dried over sodium sulfate. After removal of the ether at reduced pressure, the residue is recrystallized from ether-petroleum ether (30–60° C.) to give the product, melting point 25.5–28° C.

EXAMPLE XXIX

Preparation of 4,4-azo-1-(benzenesulfonyloxy)pentane

By the procedure of Example XXVIII, treatment of 4,4-azopentanol-1 (Example I) with benzenesulfonyl chloride is productive of 4,4-azo-1-(benzenesulfonyloxy)pentane.

EXAMPLE XXX

Preparation of 3,3-azo-1-(p-bromobenzenesulfonyloxy) butane

By the procedure of Example XXVIII, treatment of 3,3-azobutanol-1 (Example V) with p-bromobenzenesulfonyl chloride is productive of 3,3-azo-1-(p-bromobenzenesulfonyloxy)butane.

EXAMPLE XXXI

Preparation of N-methyl-N'-(3,3-azobutyl)piperazine

A solution of 5 g. of 3,3-azo-1-(p-toluenesulfonyloxy) butane and 4 g. of N-methylpiperazine in 40 ml. of N,N-dimethylformamide is held at 82° C.±2° for 6½ hours. The solution is then cooled and allowed to stand 16 hours. The solution is diluted with 150 ml. of water, acidified strongly with hydrochloric acid, and extracted with several portions of ether. The aqueous portion is made strongly basic with sodium hydroxide and extracted with 6 small portions of ether. The extracts are combined and dried over sodium hydroxide. After removal of the ether, the residue is distilled, the fraction boiling at 33–50° C. at 2–15 mm. being collected. Redistillation of the distillate with collection of the fraction boiling at 47° C. at 2 mm. affords the product.

EXAMPLES XXXII–XXXVIII

By substitution of the appropriate amine, treatment of 3,3-azo-(p-toluenesulfonyloxy)butane by the method of Example XXXI is productive of the following products.

| Example | Starting amine | Product |
| --- | --- | --- |
| XXXII | Dimethylamine | (3,3-azobutyl)dimethyl amine |
| XXXIII | Morpholine | 1-(3,3-azobutyl)morpholine |
| XXXIV | 3-dehydropiperidine | 1-(3,3-azobutyl)-3 dehydropiperidine |
| XXXV | Dicyclopentylamine | (3,3-azobutyl)dicyclopentylamine |
| XXXVI | (2-dimethylaminoethyl) methylamine | (3,3-azobutyl)(2-dimethyl aminoethyl)methyl amine |
| XXXVII | Diallylamine | Diallyl(3,3-azobutyl) amine |
| XXXVIII | Dipropargylamine | (3,3-azobutyl)dipropargyl amine |

EXAMPLE XXXIX

Preparation of N-methyl-N-(3,3-azobutyl) benzylamine HCl

A solution of 1.990 g. of 3,3-azo-1-(p-toluenesulfonyloxy)butane and 0.992 g. of N-methylbenzyl amine in 16 ml. N,N-dimethyl formamide is heated to 85° C. and held at 85° C. ±5° for 7½ hours. The solution is cooled, poured into 80 ml. of water, and acidified with hydrochloric acid. The acidic solution is extracted with ether, then made strongly basic with sodium hydroxide. The product is extracted into ether and the ethereal extracts are divided over sodium hydroxide. Addition of ethereal hydrogen chloride gives the product as a sticky solid. Recrystallization from acetone gave the purified product, as a hydrochloride salt, melting point 136–140° C.

The compound of this example exhibits diuretic activity.

EXAMPLES XL–XLII

By substitution of the appropriate amine, treatment of 3,3-azo-(p-toluenesulfonyloxy)butane by the method of Example XXXIX is productive of the following products, isolated as the hydrochloride salts.

| Example | Starting amine | Product |
| --- | --- | --- |
| XL | Didodecylamine | (3,3-azobutyl)didodecyl amine.HCl. |
| XLI | Dibenzylamine | (3,3-azobutyl)dibenzyl amine.HCl. |
| XLII | 1,2,3,4-tetrahydroiso quinoline | 2-(3,3-azobutyl)-1,2,3,4 tetrahydroisoquinoline. HCl. |

EXAMPLE XLIII

Preparation of N-(4,4-azopentyl)piperidine

To 16.7 ml. of 1 M boron hydride in tetrahydrofuran cooled in Dry Ice-acetone is added 1.95 g. of 1-(4,4-azopentanoyl)-piperidine in 10 ml. of redistilled tetrahydrofuran. The temperature remained between 0 and 60° C. throughout. When the addition is complete, the solution is brought to reflux and held 20 min., then cooled in ice and 2.5 ml. of 6 N hydrochloric acid is added carefully. The solution is warmed briefly and poured into 50 ml. of water. The solution is made strongly acidic with hydrochloric acid and extracted with several small portions of ether. The ethereal extracts are combined and evaporated. The residue is added to 40 ml. of 1 N hydrochloric acid and the solution is heated on the steam bath for 1½ hours. The cooled solution is extracted with ether, then made strongly basic with solid sodium hydroxide. The basic solution is extracted with 3 portions of ether. The ethereal extracts are combined and dried, and the ether is evaporated at reduced pressure. The residue is distilled to give the product, boiling point 60–62° C. at 3 mm.

EXAMPLE XLIV

Preparation of 3,3-azobutyraldehyde

A solution of 4.86 g. of 3,3-azo-1,-1dimethoxybutane (Example VII) and 0.5 ml. of concentrated hydrochloric acid in 30 ml. of acetone in water (3:1 by volume) is allowed to stand 16 hours. The solution is saturated with salt, and extracted with 3 portions of ether. The extracts are combined, washed with brine and dried over sodium sulfate. After removal of the ether at reduced pressure, the product is distilled, boiling point 49–49.5° C. at 37 mm.

EXAMPLE XLV

Preparation of 1-amino-3,3-azobutane hydrochloride

A solution of 60 ml. of 5 N sodium hydroxide is diluted to 100 ml. with water, cooled to 0° C. and 12.50 g. of bromine is added thereto dropwise. To the resulting solution is added 6.22 g. of 4,4-azopentanamide. The solution is stirred 2½ hours at 0–20° C., then warmed slowly to 45° C., at which temperature a mild exothermic reaction begins. The temperature rises to 60° C. and then drops. The solution is distilled at reduced pressure and the distillate (about 20 ml.) is collected in 20 ml. of 3 N hydrochloric acid. The distillate is made basic with sodium hydroxide and extracted with several portions of ether. The combined ethereal extracts are dried over sodium sulfate and then treated with hydrogen chloride. The product separates as thin glistening plates, melting point 170–172° C.

The compound of this example exhibits hypoglycemic activity.

EXAMPLE XLVI

Preparation of N-(3,3-azobutyl)-N'-(p-tolylsulfonyl)urea

A solution of 0.810 g. of 1-amino-3,3-azobutane hydrochloride (Example XLV) in 4 ml. of 20% sodium hydroxide is extracted with four small portions of ether to give 1-amino-3,3-azobutane free base. The combined ether extracts are dried over potassium hydroxide and anhydrous calcium sulfate, filtered through diatomaceous earth and treated dropwise with 1.32 g. of p-tolylsulfonyl isocyanate with good stirring. The mixture is stirred ½ hour and the precipitated product removed by filtration. The product is recrystallized from acetone-hexane, melting point 138–140° C. (dec.).

The compound of this example exhibits hypoglycemic activity.

EXAMPLE XLVII

Preparation of N-(3,3-azobutyl)-N'-n-propylurea

To 300 mg. of 3,3-azobutylamine is added 240 mg. of n-propyl isocyanate. The crystalline material that results on cooling is recrystallized from ether at −15° C. to afford white crystals with melting point 48–49° C.

EXAMPLE XLVIII

Preparation of 3,3-azobutyl methanesulfonate

A solution of 2.0 g. of 3,3-azobutanol-1 in 30 ml. of chloroform is added with stirring at below 10° C. to a solution of 3.3 ml. of methanesulfonyl chloride in 30 ml. of chloroform. To this solution is added 3.4 ml. of pyridine dropwise holding the temperature below 5° C. The resulting solution is stirred 2 hours at 0–5° C. and allowed to warm to room temperature. The solution is washed twice with dilute hydrochloric acid and twice with cold dilute sodium hydroxide solution, then dried over magnesium sulfate. Removal of the solvent at reduced pressure yield the product as a colorless oil.

EXAMPLE XLIX

Preparation of β-phenethyl 4,4-azopentanoate

A solution of 2.36 g. of β-phenethyl alcohol and 5 ml. of triethylamine in 50 ml. of benzene is cooled to 4° C. and a solution of 3.0 gm. of 4,4-azopentanoyl chloride in about 20 ml. of benzene is added over a five minute period, with cooling in ice. The mixture is warmed to about 25° C. and stirred 30 min., then allowed to stand overnight.

The mixture is extracted consecutively with water, dilute hydrochloric acid, dilute cold sodium carbonate solution, and saturated sodium chloride solution, then dried over sodium sulfate. The solvent is removed at reduced pressure and the yellow oily residue is distilled, giving the product with boiling point 85° C. at 0.14 mm.

L TO LIV

By substitution of the appropriate alcohol, treatment of 4,4-azopentanoyl chloride (Example XXII) by the method of Example XLIX is productive of the following esters.

| Example | Starting alcohol | Product |
|---|---|---|
| L | Decanol-1 | n-Decyl 4,4-azopentanoate. |
| LI | 3-methoxypropanol-1 | 3-methoxypropyl 4,4-azopentanoate. |
| LII | Allyl alcohol | Allyl 4,4-azopentanoate. |
| LIII | Propargyl alcohol | Propargyl 4,4-azopentanoate. |
| LIV | 3,3-azobutanol-1 (Example V). | 3,3-azo-n-butyl 4,4-azopentanoate (3-azi-n-butyl 4,4-azopentanoate). |

EXAMPLE LV

Preparation of 4-pyridylmethyl 4,4-azopentanoate maleic acid salt

To a stirred ice cold solution of 4 ml. of triethyl amine and 2.18 g. of 4-pyridylcarbinol in 35 ml. of benzene is added a solution of 2.70 gm. of 4,4-azopentanoyl chloride in 15 ml. of benzene maintaining the temperature at about 10° using ice cooling. The mixture is stirred 2 hours while warming to room temperature, then it is washed consecutively with water, sodium bicarbonate solution, and sodium chloride solution, and the solvent is evaporated at reduced pressure. The black oily residue is dissolved in 15 ml. of ether and ethanolic maleic acid is added until no further oil separates from the solution. Trituration causes crystallization. The crystals are filtered and recrystallized from acetone-ether at −15° C. to give the product with melting point 70–72° C.

The compound of this example exhibits diuretic and hypocholesteremic activity.

EXAMPLES LVI TO LVIII

By substitution of the appropriate alcohol, treatment of 4,4-azopentanoyl chloride (Example XXII) by the method of Example LV, is productive of the following compounds, isolated as the maleate salts.

| Example | Starting alcohol | Product |
|---|---|---|
| LVI | 2-dimethylaminoethanol | 2-dimethylaminoethyl 4,4-azopentanoate. |
| LVII | 3-(1-piperidyl)propanol-1 | 3-(1-piperidyl)-n-propyl 4,4-azopentanoate. |
| LVIII | 2-(N-methylanilino)ethanol | 2-(N-methylanilino)ethyl 4,4-azopentanoate. |

EXAMPLE LIX

Preparation of β-phenoxyethyl 5,5-azohexanoate

By the method of Example XLIX and substituting 2-phenoxyethyl alcohol for 2-phenethyl alcohol and 5,5-azohexanoyl chloride (Example XIV) for 4,4-azopentanoyl chloride, 2-phenoxyethyl 4,4-azopentanoate is prepared.

EXAMPLE LX

Preparation of 3-chloropropyl 6,6-azoheptanoate

By the method of Example XLIX and substituting 3-chloropropanol-1 for 2-phenethyl alcohol and 6,6-azoheptanoyl chloride (Example XV) for 4,4-azopentanoyl chloride, 3-chloro propyl 6,6-azoheptanoate is prepared.

EXAMPLE LXI

Preparation of N-phenyl-N'-(4,4-azobutyl)thiourea

A mixture of 82 mg. of 3,3-azobutyl amine and 100 mg. of phenyl isothiocyanate is allowed to stand 5 minutes, then triturated in Dry Ice with ether. The resulting crystalline solid is recrystallized from ethanol-water and ethanol-hexane to afford the product as glistening plates with melting point 84.5–86° C.

EXAMPLES LXII TO LXVI

By substitution of the appropriate isothiocyanate, treatment of 1-amino-3,3-azobutane free base (Example XLVI) by the method of Example LXI is productive of the following products.

| Example | Isothiocyanate | Product |
|---|---|---|
| LXII | Ethyl isothiocyanate | N-(3,3-azobutyl)-N'-ethylthiourea. |
| LXIII | 2-napthyl isothiocyanate | N-(3,3-azobutyl)-N'-(2.naphthyl)thiourea. |
| LXIV | Heptyl isothiocyanate | N-(3,3-azobutyl)-N'-heptylthiourea. |
| LXV | o-Tolyl isothiocyanate | N-(3,3-azobutyl)-N'-(o-tolyl)thiourea. |
| LXVI | Allyl isothiocyanate | N-(3,3-azobutyl)-N'-allylthiourea. |

EXAMPLE LXVII

Preparation of methyl 6,6-azoheptanoate

A solution of 1 gm. of 6,6-azoheptanoic acid (prepared as in Example XVII) and two drops of concentrated hydrochloric acid in 25 ml. of methanol is allowed to stand at room temperature overnight, then poured into water containing some sodium bicarbonate. The resulting mixture is extracted with three 25 ml. portions of ether, the ethereal extracts are combined, washed with saturated sodium chloride, and dried over sodium sulfate. The solvent is evaporated at reduced pressure and the residue is distilled, affording the product boiling at 45° C. at 0.3 mm.

EXAMPLE LXVIII

Preparation of methyl 5,5-azohexanoate

Using the method of Example LXVII and substituting 4,4-azohexanoic acid for 5,5-azoheptanoic acid, the product, with boiling point 50° C. at 3 mm., is obtained.

The compound of this example exhibits analgesic and diuretic activity.

EXAMPLE LXIX

Preparation of 3,3-azobutylbiguanide hydrochloride

To a solution of 1.075 mg. of 3,3-azobutylamine hydrochloride and 2.00 ml. of 5 N sodium hydroxide in 2 ml. of 1:1 methanol:water is added 1.525 gm. of N-amidino methyl isourea hydrochloride (prepared as described in Japanese Pat. 26,694/65) and the solution is allowed to stand 22 hours. The solvent is removed at reduced pressure and the oily residue is dissolved in ethanol and crystallized at −15° C. The mother liquors after removal of the crystalline sodium chloride are evaporated to about 5 ml., refiltered, and treated with about 5 ml. acetone and ether to the cloud point. After several days at −15° C., the fine fibrous needles are filtered off and dried to afford the product with melting point 129–133° C. (dec.).

EXAMPLE LXX

Preparation of 2,4-dinitrophenylhydrazone of 3,3-azobutrylaldehyde

A solution of 0.25 gm. of 2,4-dinitrophenylhydrazine in 15 ml. of boiling ethanol is treated with 0.14 ml. of 3,3-azobutrylaldehyde and 3 drops of concentrated hydrochloric acid. The red solution is filtered hot and evaporated to a dark oil. The oily residue is treated with 5 ml. of ethanol and triturated. The resulting crystals are recrystallized several times from ethanol to give the product as yellow orange crystals, with melting point 90.5–92° C.

EXAMPLE LXXI

Preparation of semicarbazone of 3,3-azobutyraldehyde

To a solution of 0.1 gm. of semicarbazide hydrochloride and 0.15 gm. of potassium acetate in 2.5 ml. of water is added 128 mg. of 3,3-azobutyraldehyde. The resulting mixture is allowed to stand at room temperature for one hour and the crystalline precipitate is filtered off and recrystallized from water to give the product.

EXAMPLES LXXII AND LXXIII

Preparation of derivatives of 3,3-azobutyraldehyde

Using the method described in Example LXXI and making the reagent substitution shown the following products are prepared.

| Example | Reagent | Product |
|---|---|---|
| LXII | Thiosemicarbazide hydrochloride. | 3,3-azobutyraldehyde thiosemicarbazone. |
| LXXIII | Hydroxylamine hydrochloride. | 3,3-azobutyraldoxime. |

EXAMPLES LXXIV TO LXXVI

Preparation of derivatives of 3,3-azobutyraldehyde

Using the method of Example LXX and substituting the appropriate hydrazine for 2,4-dinitrophenylhydrazine, the following compounds are prepared:

| Example | Hydrazine | Product |
|---|---|---|
| LXXIV | Hydrazine | 3,3-azobutyraldehyde hydrazone. |
| LXXV | N-aminopiperidine | N-(3,3-azobutylidenimino)-piperidine. |
| LXXVI | p-Chlorophenylhydrazine | 3,3-azobutyraldehyde p-chlorophenylhydrazone. |

EXAMPLE LXXVII

Preparation of 3,3-azobutyl benzoate

A solution of 900 mg. of benzyl chloride in 5 ml. of benzene is added to a stirred solution of 600 mg. of 3,3-azobutyl alcohol and 2 ml. of triethylamine in 50 ml. of benzene. The mixture is stirred 3 hours, extracted successively with water, diluted hydrochloric acid, dilute sodium hydroxide, and saturated sodium chloride solution, then dried over sodium sulfate. Distillation of the residue remaining after evaporattion of the solvent gives the product, with boiling point 82° C. at 0.1 mm.

EXAMPLES LXXVIII TO LXXXI

Preparation of esters of 3,3-azobutyl alcohol

Using the method of Example LXXVII and substituting the appropriate acid chloride for benzoyl chloride, the following compounds are prepared.

| Example | Acid chloride | Product |
|---|---|---|
| LXXXVIII | 4,4-azopentanoyl chloride | 3,3-azobutyl 4,4-azo-pentanoate (3,3-azobutyl-4-azipentanolate). |
| LXXIX | Acetyl chloride | 3,3-azobutyl acetate. |
| LXXX | Nicotinoyl chloride | 3,3-azobutyl nicotinate. |
| LXXXI | p-Methoxybenzoyl chloride. | 3,3-azobutyl p-methoxybenzoate. |

EXAMPLES LXXXII TO LXXXIII

Preparation of esters of 4,4-azopentanol-1

Using the methof of Example LXXVII, substituting 4,4-azopentanol-1 for 3,3-azobutyl alcohol and substituting 4,4-azopentanol-1 for 3,3-azobutyl alcohol and substituting the appropriate acid chloride for benzoyl chloride, the following products are obtained.

| Example | Acid chloride | Product |
|---|---|---|
| LXXXII | Octanoyl chloride | 4,4-azopentyl octanoate. |
| LXXXIII | m-Chlorobenzoyl chloride. | 4,4-azopentyl m-chlorobenzoate. |

EXAMPLE LXXXIV

Preparation of N-(3,3-azobutyl)benzamide

A solution of 800 mg. of benzoyl chloride in 10 ml. of benzene is added slowly to a stirred mixture of 6.77 mg. of 3,3-azobutylamine hydrochloride and 2 ml. of triethylamine in 40 ml. of benzene. The mixture is stirred 2½ hours and extracted successively with water, dilute hydrochloric acid, dilute sodium hydroxide, and saturated sodium chloride solution, then dried over sodium sulfate.

After evaporation of the solvent at reduced pressure, the residual oil is chromatographed on Grade 2 Alumina. The product is isolated as an oil.

EXAMPLES LXXXV TO XC

Preparation of substituted amides of 3,3-azobutyl amine

Using the method of Example LXXXIV and making the appropriate acid chloride substitution for benzoyl chloride, the following products are prapared.

| Example | Acid chloride | Product |
| --- | --- | --- |
| LXXXV | 4,4-azopentanoyl chloride | N-(3,3-azobutyl)-4,4-azopentanamide [N-(3,3-azo-butyl-4-azipentanamidel]. |
| LXXXVI | o-Toluyl chloride | N-(3,3-azobutyl)o-toluamide. |
| LXXXVII | Acetyl chloride | N-(3,3-azobutyl)acetamide. |
| LXXXVIII | Phenyl acetyl chloride | N-(3,3-azobutyl)phenylacetamide. |
| LXXXIX | Acryloyl chloride | N-(3,3-azobutyl)acrylamide. |
| XC | Octanoyl chloride | N-(3,3-azobutyl)octanamide. |

EXAMPLE XCI

Preparation of N-propyl-O-(3,3-azobutyl)carbamate

A mixture of 300 mg. of 3,3-azobutanol-1 and 250 mg. of N-propyl isocyanate are mixed and allowed to stand 16 hours. The mixture is heated briefly to about 80° C. and cooled to obtain the product.

EXAMPLE XCII

Preperation of 3,3-azo-1-bromobutane

To an ice-cooled suspension of 851 mg. of silver 4,4-azopentanoate in 15 ml. of dry carbon tetrachloride is added dropwise, in semi-darkness, a solution of 0.60 g. of bromine in 5 ml. of carbon tetrachloride. The mixture is stirred at room temperature for 10 min. and refluxed 15 min., then cooled and treated with 2 ml. of 1.5 M potassium carbonate and 0.5 ml. of 1 N sodium hydroxide. The mixture is stirred 10 min. and filtered through diatomaceous earth. The filtrate is carefully distilled, the product boiling at 53° C. at 32 mm.

EXAMPLE XCIII

Preparation of N-(3-ketobutyl)phenothiazine

A well stirred mixture of 2.52 g. (9.2 mmoles) of phenothiazine N-propionic acid (Godefroi et al, J. Org. Chem., 21, 1164 (1965) in 100 ml. of dry ether is treated dropwise with an ethereal solution of 25 mmoles of methyl lithium. The solution is stirred ½ hour after the addition is complete and poured into 300 g. of ice. The layers are separated, and the aqueous layer is extracted with four 30 ml. portions of ether. The combined organic extracts are washed with water to neutrality and then with brine, and dried over sodium sulfate. The ether is evaporated at reduced pressure and the oily residue is chromatographed on 100 g. of silica gel. After washing the column with benzene, the fraction eluted with 2 liters of 3% (v.:v.) ether in benzene is collected, the solvent is evaporated at reduced pressure, and the oily residue is chromatographed on 80 g. of alumina. Elution with benzene affords N-(3-ketobutyl)phenothiazine as sugar-like crystals when recrystallized from ether-hexane, melting point 55–58° C. Further elution with ether affords N-(3-hydroxy-3-methylbutyl)phenothiazine, melting point 84–84.5° C. after recrystallization from ether-hexane.

EXAMPLE XCIV

Preparation of N-(3,3-hydrazibutyl)phenothiazine and N-(3,3-azobutyl)phenothiazine A solution of 3.02 g. of N-(3-ketobutyl)phenothiazine in 150 ml. of methanol and 300 ml. of ammonia is allowed to stir at reflux for 3½ hours. The solution is cooled in Dry Ice-acetone and is then treated with 7.55 g. of hydroxylamine-O-sulfonic acid over a 2 hour period. The resulting solution is then allowed to warm to room temperature with evaporation of the excess ammonia. The mixture is filtered and the solvent is evaporated. The noncrystalline N-(3,3-hydrazibutyl)phenothiazine is dissolved in 100 ml. of ethanol and 9.5 g. of silver nitrate is added. The mixture is stirred for 40 minutes and 20 ml. of 10% sodium hydroxide solution is added dropwise over a period of 1 hour. The black mixture is stirred 2 hours at room temperature and filtered through diatomaceous earth. The solvent is partially evaporated at reduced pressure and the remainder diluted with water. The aqueous solution is extracted with three 40 ml. portions of methylene chloride and the combined extracts are dried over sodium sulfate. The residue on evaporation of the solvent is chromatographed on 100 g. of silica gel. The product is eluted using benzene and is recrystallized from ether-hexane, melting point 77–79° C.

EXAMPLE XCV

Preparation of N,N'-diphenyl-4,4-azopentanoyl hydrazide

To a well stirred water-cooled mixture of 5 ml. of 5 N sodium hydroxide and 2.6 g. of 1,2-diphenyl hydrazine in 30 ml. of dry benzene is added dropwise a solution of 1.8 g. of 4,4-azopentanoyl chloride in 15 ml. of benzene. The mixture is stirred ½ hour and the precipitate is filtered off and dissolved in methylene chloride. After treatment with activated charcoal and drying over sodium sulfate, the methylene chloride is evaporated at reduced pressure. Addition of hexane affords a crystalline precipitate which is recrystallized from methylene chloride-hexane, melting point 128–130° C.

EXAMPLE XCVI

Preparation of 1,2-diphenyl-4-(2,2-azopropyl)pyrazolidine-3,5-dione

A solution of 770 mg. of N,N'-diphenyl-4,4-azopentanoyl hydrazide in 10 ml. of benzene is treated with 1.0 ml. of freshly distilled diethyl carbonate and 0.20 g. sodium hydride (as a 54% dispersion in mineral oil) and refluxed for 16 hours. The mixture is cooled and dissolved in a mixture of benzene and 50 ml. of water with stirring. After separation of the layers, the benzene layer is extracted with 2 small portion of 5% sodium hydroxide. The sodium hydroxide extracts are combined with the aqueous layer previously obtained and washed once with benzene, then made strongly acidic with hydrochloric acid. The product is extracted into benzene and methylene chloride, after drying the combined extracts over sodium sulfate, the solvent is removed at reduced pressure. The residual red oil crystallizes, and may be recrystallized from ethanol or ethanol-water, melting point 134–134.5° C. (dec.).

EXAMPLE XCVII

Preparation of 17β-acetoxy-3,3-azo-5α-androstane

To a stirred ice cooled solution of 1.25 gm. of 17β-acetoxy-3,3-hydrazi-5α-androstane in 100 ml. of methanol, is added 2 ml. of triethylamine followed by a saturated solution of iodine in methanol. When 9.4 ml. of the methanolic iodine solution is added, a persistent yellow color develops in the reaction medium. The solution is added to 400 ml. of water and extracted with three 50 ml. portions of ether. The combined ethereal extracts are dried and the solvent is evaporated at reduced pressure. The crystalline residue is recrystallized from methylene chloride-hexane to give the product with melting point 135–136° C.

EXAMPLE XCVIII

Preparation of 3,3-azo-17α-methyl-5α-androstan-17β-ol

To a stirred solution of 500 mg. of 3,3-hydrazi-17α-methyl-5α-androstan-17β-ol in 20 ml. of methanol is added 0.4 ml. of triethylamine, followed by a solution of iodine in methanol. When a persistent red color develops in the reaction medium, the addition of methanolic iodine is stopped and the reaction mixture is drowned in 100 ml. of water. The solution is extracted with three 30 ml. portions of ether, the combined ethereal extracts are dried and the solvent is evaporated at reduced pressure. The residue is chromatographed on silica gel; eluting with 3% ether-in-benzene affords the product with melting point 153–155° C. (dec.).

EXAMPLE XCIX

Preparation of 2,2-azopropanoic acid

A solution of 1.72 gm. of 2,2-azopropanol in 60 ml. of acetone is cooled to 10° C. and a solution of chromium trioxide in aqueous sulfuric acid is added dropwise, maintaining the temperature near 10° C., until no further color change from red-brown to blue-green is noted. The solution is diluted to 30 ml. with acetone and the addition of chromium trioxide solution resumed, again until no further color change is noted. The mixture is filtered and treated with 6 ml. of 5 N sodium hydroxide solution. The solvent is evaporated at reduced pressure to about 25 ml. and the residue is extracted with three 10 ml. portions of ether. The combined extracts are dried and the solvent is evaporated to give a tan oil. Distillation and redistillation affords the product as a glass with boiling point 39° C. at 0.4 mm.

What is claimed is:

1. A compound selected from the group consisting of 4,4-azopentanoic acid and pharmaceutically acceptable salts thereof.

2. A compound selected from the group consisting of 5,5-azohexanoic acid and pharmaceutically acceptable salts thereof.

3. A compound selected from the group consisting of 6,6-azoheptanoic acid and pharmaceutically acceptable salts thereof.

4. A compound selected from the group consisting of 1-amino-3,3-azobutane and pharmaceutically acceptable salts thereof.

5. The compound, methyl 5,5-azohexanoate.
6. The compound, 3,3-azobutanol-1.
7. The compound, 4,4-azopentanol-1.
8. The compound, 3,3-azo-1,1-dimethoxybutane.

References Cited

UNITED STATES PATENTS 3,171,834    3/1965    Paulsen _____ 260—239

OTHER REFERENCES

Mellor's Modern Inorganic Chemistry (London, 1939), pp. 527 and 531.

ALTON D. ROLLINS, Primary Examiner

U.S. Cl. X.R.

71—92; 260—239.5, 240, 243, 247.5, 268, 288, 293, 294, 294.3, 295, 296, 310, 326.5, 999